M. URIBE-TRONCOSO.
SCHEMATIC EYE FOR SKIASCOPY.
APPLICATION FILED JUNE 10, 1920.

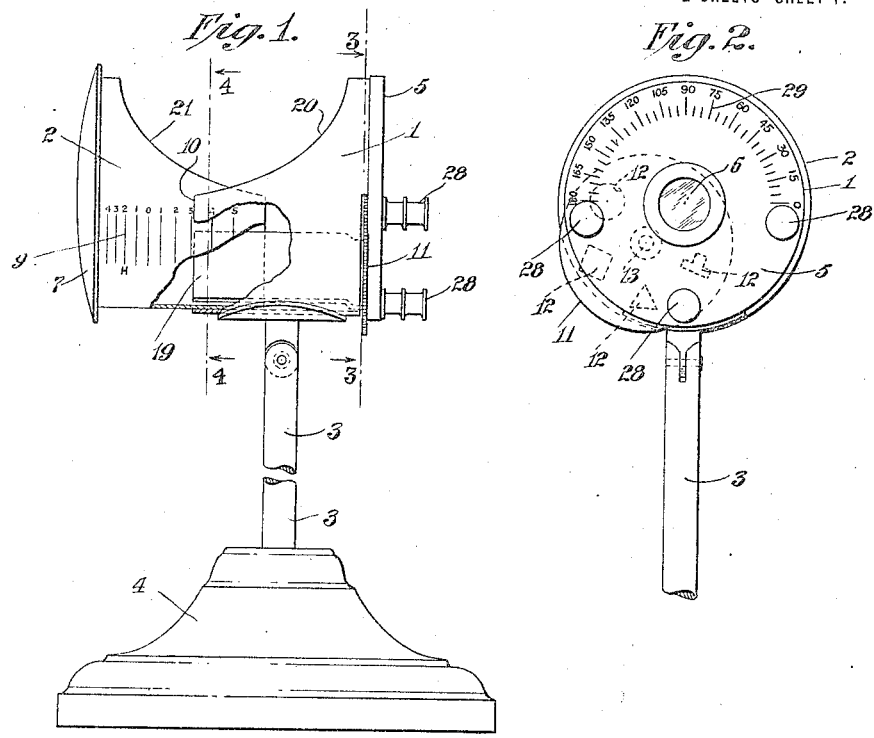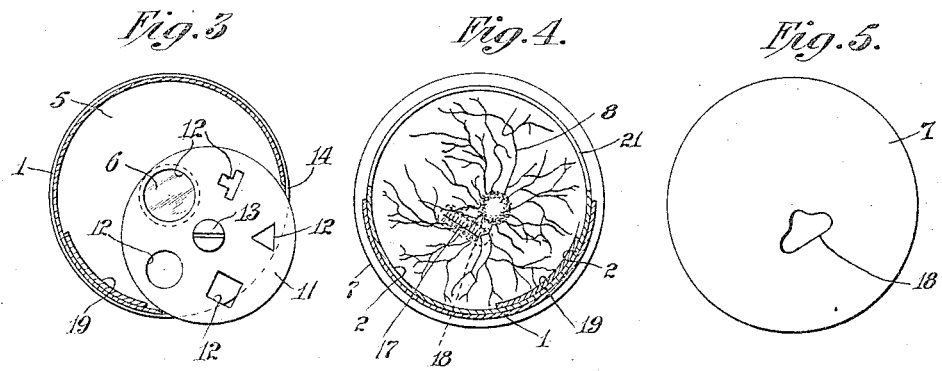

1,377,740.

Patented May 10, 1921.

UNITED STATES PATENT OFFICE.

MANUEL URIBE-TRONCOSO, OF NEW YORK, N. Y., ASSIGNOR TO WILLIAM URIBE-TRONCOSO, OF NEW YORK, N. Y.

SCHEMATIC EYE FOR SKIASCOPY.

1,377,740.  Specification of Letters Patent.  Patented May 10, 1921.

Application filed June 10, 1920. Serial No. 387,815.

*To all whom it may concern:*

Be it known that I, MANUEL URIBE-TRONCOSO, a citizen of Mexico, residing at New York, in the county of New York and State of New York, have invented certain new and useful Improvements in Schematic Eyes for Skiascopy, of which the following is a full, clear, and exact description.

This invention relates to skiascopy and particularly to devices for use in the instruction of medical students in this subject. A thorough understanding of the causes which produce the formation and movements of light and shadow in the pupil in different conditions of refraction and the influence of the shape of the pupil in the field of illumination and in the field of examination on the retina has been difficult to obtain by medical students, because the explanations of the optical principles have heretofore been principally theoretical, and are difficult to understand and apply in practice.

An object of my invention is to provide an instrument or schematic eye for illustrating the action of the shadow test in the eye, in which the actual movement of the light and shadow upon the retina can be readily observed from without.

A further object is to provide a schematic eye of this type which can be readily adjusted to illustrate the shadow test under any of the refractive conditions of emmetropia, myopia, hypermetropia, or astigmatism.

A further object is to provide a device for observing the influence of the shape of the pupil in the field of illumination and in the field of examination on the retina.

A further object is to provide a device of the above type which is simple in construction and operation, and inexpensive.

Other objects and advantages will be apparent from the following description and the novel features of my invention will be particularly pointed out in claims.

My invention comprehends the provision of a small casing having an opening or lens in one end wall to correspond with the cornea and lens of the human eye and a representation of the retina upon the opposite end wall, the casing comprising relatively adjustable telescopic parts for illustrating the shadow test under various possible conditions of the eye such as emmetropia, myopia, hypermetropia, or astigmatism. I may further provide one or more diaphragms with openings of different shapes and sizes which may be placed before or beyond the lens for illustrating the influence of the shape or size of the pupil. My invention further comprehends the construction of the walls in such a manner that the operator or student while manipulating the mirror and observing the shadow in the pupil, can also easily examine through the side walls the actual movement of the light upon the retina. The invention also comprises certain details of construction as will hereinafter appear.

In the drawings:

Figure 1 is a side elevation of a preferred embodiment of my invention;

Fig. 2 is a front end elevation of a portion of the same;

Fig. 3 is a sectional elevation taken substantially along the line 3—3 of Fig. 1;

Fig. 4 is a sectional elevation taken substantially along the line 4—4 of Fig. 1;

Fig. 5 is an elevation of the rear wall of the casing;

Figure 8:
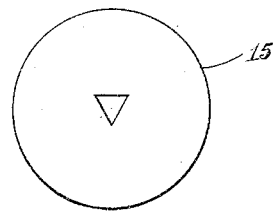
Fig. 8 is a plan of a detail.

In carrying out my invention I may provide a casing comprising two cylindrical telescopic parts 1 and 2, one of the parts, such as 1, being pivotally carried by the upper end of a standard 3 extending upwardly from a supporting base 4. The part 1 removably carries in one end wall 5 a lens 6, which corresponds with the lens of the human eye, and can be made easily removable. The part 2 carries upon the inner face of its end wall 7 a diagrammatic representation 8 of the retina of the human eye, usually upon a paper disk, so that the rays of light passing through the lens 6 into the casing will fall upon the diagrammatic retina 8 in a manner similar to that occurring in the human eye. By adjusting the telescopic parts of the casing toward and from each other, the distance from the retina to the lens can be varied at will so that various possible selected refractive conditions of the eye can be represented, to wit: normal, near-sightedness and far-sightedness, which conditions in medical parlance are called emmetropia, myopia and hypermetropia, respectively. A scale 9 upon the exterior side wall of the inner telescopic part 2 coöperates with an edge 10 of the complementary part 1 to indicate to the observer, the refractive condition of the eye represented by that particular adjustment of the parts 1 and 2. A disk 11 (Figs. 1 to 5) having apertures 12 of any selected shape or size therein, is pivoted by a screw 13 to the end wall 5 so as to bring each of the apertures 12 into alinement with the lens upon rotation of the disk. While the disk 12 may be pivoted upon the exterior face of the wall 5 and in front of the lens I prefer to place it upon the inner face of the wall 5 with a small portion projecting through a slot 14 in the side of the casing part 1 for manual operation. Instead of the single pivoted disk 11 I may employ a plurality of disks 15, one of which is illustrated in Fig. 8, each having an aperture of a selected shape and size which can be at will placed in and removed from a frame 16 carried upon the front wall 5 and provided with a plurality of semi-circular receiving grooves 16$^a$ concentric to the lens, the grooves supporting the disks with their apertures in alinement with and adjacent to the lens. The separate disks 15 are likely to become lost or broken and I therefore prefer the single pivoted disk 11, since it is also more easily and rapidly manipulated.

Upon a portion of the retina I place or print a small scale 17, which may conveniently be in millimeters, for measuring the displacement of the field of illumination upon the field of examination on the retina when the observer's mirror is tilted, or for permitting the accurate measure of the areas of light and shadow upon the retina. In order to illuminate the scale, I may provide an aperture 18 of irregular outline in the rear or end wall 7 of the telescopic part 2 for exposing the scale carrying portion of the diagrammatic retina to the action of light from behind so as to illuminate the scale. The paper or other substance upon which the representation of the retina is printed is sufficiently translucent for this purpose. A spring strip 19 carried by an interior side wall of the part 1 extends over the telescoping wall of the part 2 for frictionally holding the parts in any adjusted telescopic position. The parts may also be similarly held by means of a slot in one part and a pin or pivot coöperating therewith and carried by the other part.

Figure 6:
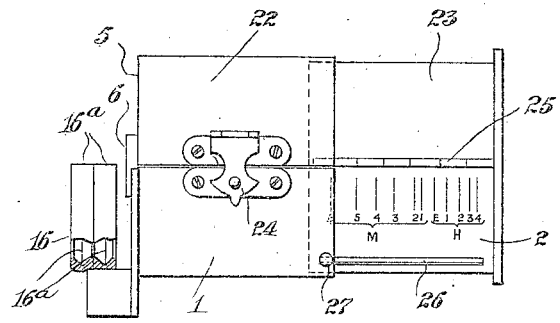
Fig. 6 is a side elevation of a slightly modified construction.
Figure 7:
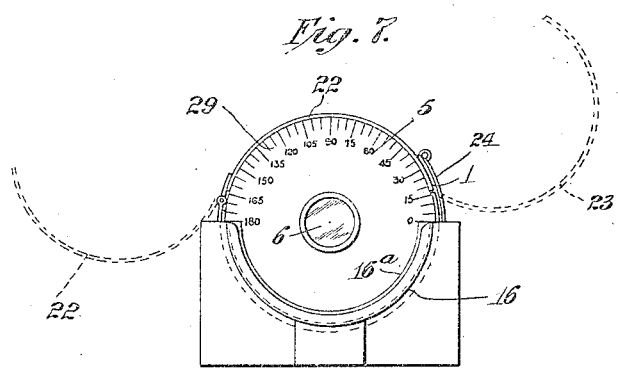
Fig. 7 is a front end elevation of the same.

In order that the person manipulating the mirror for projecting light through the lens and upon the retina, may directly observe the actual movement of the light and shadow upon the retina I provide a window or door preferably in the side walls. In the embodiment illustrated in Figs. 1 to 5, I have cut away a portion in the upper side walls of each of the telescopic parts 1 and 2 along the lines 20 and 21 respectively, the strip 19 assisting in preventing the tipping of one part laterally out of the other. In the embodiment illustrated in Figs. 6 to 8, I have provided a hinged door 22 in the upper lateral wall of the part 1 and a hinged door 23 in the corresponding portion of the lateral wall of the part 2. A latch 24 holds the door 22 closed when desired, but when direct observations are to be made, the door 22 is first opened which provides access to the door 23 and permits it to be swung about its hinge 25 to open position in a direction opposite to the movement of door 22. With the doors in open position direct observations of the retina may be readily made. This form of casing may have the disks 15 as indicated or the single disk 11 illustrated in Figs. 1 to 3. In order to limit the telescopic movement of the parts 1 and 2 and avoid tipping I may provide a longitudinal slot 26 in the telescopic wall of one part into which is projected the end of a screw or pin 27 carried by the corresponding telescopic wall of the other part, the ends of the slot limiting the telescopic movement.

Upon the end wall 5 of my schematic eye I provide suitable supporting means by means of which test glasses can be arranged in front of the lens in desired combinations according to their optical properties, and their effect upon or change within the eye witnessed through the windows in the side walls. This supporting means may comprise studs 28 arranged concentric to the lens 6 and upon the lower semi-circular marginal portion of the wall 5 as indicated in Figs. 1 and 2, or the grooves 16$^a$ of the frame 16 illustrated in Figs. 6 and 7 may be employed for this purpose. The end wall 5 is also provided with a graduated semicircular scale 29 upon its upper marginal portion and concentric to the lens for the purpose of reference in selecting the position of the axis of cylindric lenses when the latter are supported in grooves 16$^a$ or upon studs 28 in front of the lens for testing purposes. The lenses can be shifted upon their supports (studs 28 or grooves 16$^a$) in order to change the angular position of their axes in testing for astigmatism.

The use of the device will now be explained. Broadly the determination of the refracting condition of the eye is made by throwing light into it through the lens by means of a small mirror and observing the effect of slightly tilting the mirror. The skiascopic shadow can be produced in its simplest form through a hole in a diaphragm placed one or two inches in front of a screen or by taking out the lens in the schematic eye, and throwing the light from a plane mirror in the ordinary way through the circular opening of the diaphragm or lens opening. Upon movement of the mirror, the formation of the crescentic shadow similar to that found in skiascopy and moving with the mirror will be observed.

If the refraction comes into play by reinserting the lens, the same shadows are formed in the pupil, but the direction of their movement varies with the refraction. The conditions produced upon the retina by the altered conditions can be studied in the interior of the schematic eye through the window opening or doors provided in the lateral walls for that purpose.

If now the schematic eye is made hypermetrope or emmetrope, by shifting the telescopic parts toward or from each other, and then examined by the aperture in the plane mirror of the operator at one meter distance, a shadow will be seen in the pupil, upon movement of the mirror, which is moving directly or with the mirror. By now withdrawing the observer's eye from the mirror, keeping the light in the pupil and imparting the same movement to the mirror, and looking directly upon the retina by means of the cut away windows or doors in the upper lateral walls, a small circle of illumination moving also with the movement of the mirror will be observed.

If now the schematic eye is made myopic of more than one diopter by a further separating movement of the telescopic parts 1 and 2, and observations made as before described, the movement of the shadow will appear through the aperture of the mirror to be reversed or against the movement of the mirror. However, by looking directly inside the schematic eye by means of the open doors or windows, it will be observed that no change has been produced, and that the area of illumination continues to move upon the retina in the same way as in hypermetropia and emmetropia, viz: directly or with the mirror.

This apparent contradiction is due to the fact that in myopia the shadow in the pupil is seen by the observer as an inverted image because the rays emerging from the eye are convergent, and have already crossed at the punctum remotum in front of the observer, whereas in emmetropia and hypermetropia the image of the fundus is upright, since the rays emerging from the emmetropic eye are parallel and divergent when emerging from the hypermetropic eye.

It is necessary to have always in mind that the path of the rays going into the patient's eye from the source of light, is entirely different from the path of the outgoing rays. The former are always divergent when entering the eye, and are made to converge by the refracting media. From the illuminated portion of the retina the rays go out in a different manner according to the refraction, as said above.

To demonstrate the path of the outgoing rays, the scale upon the retina of the schematic eye is illuminated from behind by the lamp, the eye is made hypermetropic, and the observer looking directly at the fundus (the use of the mirror being unnecessary) will readily perceive the image of the scale upright with the small divisions upon the top of the horizontal line and the figures below. This is true at any distance from the eye. The same facts hold good for emmetropia. In the case of myopia, the inversion of the image is easy to observe in strong degrees, —4 or —5 D. for instance. Farther away from the punctum remotum (20 to 25 centimeters) the scale will appear inverted with the small divisions below the horizontal line and the figures upside down. By now approaching to the eye a point will be reached in which the image appears indistinct, and still nearer an upright image will be visible.

To determine the cause of the crescentic shadow which appears on the pupil, while upon the retina there is only a displacement of a small area of light, the eye is made again hypermetropic, the light is moved from behind to one side, the mirror held in the ordinary way, and the fundus illuminated, swinging the eye until the scale is illuminated and made to occupy the center, with the pupil illuminated in its whole extent without shadows. After ascertaining how many millimeters are now covered by the light, the mirror is slightly tilted and immediately a crescentic shadow will be produced, and part of the scale will become dark. Let us suppose that the diameter of the area of illumination on the whole pupil covered at first 4 millimeters, from 1 to 4, and that on tilting the mirror 1 mm. became dark to the right, leaving the other 3 in the light. The millimeter which became dark, is a part of the field of examination and the shadow has been produced by the displacement of the area or field of illumination upon the field of examination.

Looking directly inside at the retina, it will be observed that the area of illumination which at first covered from 1 to 4 mm. is displaced from 2 to 5, this extra millimeter being at first invisible to us through the pupil.

Thus the fundamental fact in the formation of the shadow has been demonstrated, viz; the displacement of the field of illumination upon the field of examination.

The field of illumination or area illuminated on the retina, has the form of the pupil or that of the diaphragm through which the rays of light have crossed; except in emmetropia or slight ametropia, when the retina becomes the conjugated focus of the source of light; in this case the image of the latter and not a circle of diffusion being painted upon the retina.

To prove this fact, diaphragms with apertures of different shapes, triangular, quadrangular, the shape of a hat, etc., can be used instead of the circular one in the schematic eye. The inner cylinder or part 2 is withdrawn and the pupil illuminated with the mirror by an assistant at the ordinary distance (1 meter). By using a piece of white cardboard the beam of light is next intercepted behind the pupil inside the inner cylinder. Between the lens and its focus, an illuminated area corresponding in shape to the diaphragm (triangular or hat shaped, etc.,) is easily observed; this area of light being erect. If now the screen is placed in or near to the focus on either side of it, an inverted image of the source of light (represented by the mirror) can be detected, it being the conjugated focus of the light. Farther away the screen will show a larger, more diffuse area of light, always the same shape of the pupil, but inverted, the rays of light having already crossed on the focus.

The field of examination is that part of the eye ground that falls under direct observation through the pupil, and is limited by the size of the patient's pupil whose image is painted upon the retina of the observer; the latter exercising his accommodation, not for seeing the patient's retina, but his pupil.

With a round opening the field of examination is round; with a triangular, quadrangular, hat shaped, etc. aperture the pupil takes the same form and becomes triangular, etc., the shadow assuming the shape of the side of the aperture through which the light has been moved. This is true in all forms of ametropia. The disks of my device provide the necessary diaphragms and apertures. In testing for astigmatism, the cylindric lenses can be mounted in grooves 16$^a$ or upon studs 28 and rotated until the axis has any desired angle, the scale 29 assisting in the determining and measuring of the angle.

Obviously various changes may be made in the details of the embodiment herein described and illustrated, within the principle and scope of my invention.

I claim:

1. A schematic eye comprising telescopic parts, one of which carries a lens and another a diagrammatic retina, said parts being relatively adjustable to selectively represent various conditions of myopia, emmetropia and hypermetropia, one of said parts having an observation window permitting direct observation of the retina from a point exterior to the schematic eye, and at one side of and in addition to the pupil opening.

2. In a schematic eye, a casing comprising relatively adjustable parts, one of said parts having an opening to represent the pupil opening of the eye and the other of the parts having a representation of a retina, a lens carried by the part having the pupil opening and arranged in alinement with that opening, said casing being also provided with an observation window at one side of the lens opening whereby direct inspection of the face of the retina is possible.

3. In a schematic eye, a casing comprising relatively adjustable parts, one of said parts having an opening to represent the pupil opening of the eye, and the other of the parts having a representation of a retina, a lens carried by the part having the pupil opening and arranged in alinement with that opening, and means for varying the effective pupil opening to various shapes and sizes, said casing having an observation window at one side of the pupil opening for permitting a direct inspection of the face of the retina.

4. A schematic eye comprising a lens, a diagrammatic retina, means for supporting the same in spaced relation and permitting direct observation of the retina independently of the lens, and means for restricting the passage of light from the lens to the retina to that through openings of selected shapes and sizes disposed adjacent the lens and in the lines of vision of the schematic eye.

5. A schematic eye comprising a lens, a diagrammatic retina, means for supporting the same in spaced relation and permitting direct observation of the retina from a point in front of and independently of the lens, and a diaphragm containing apertures of different shapes adjustably carried by the supporting means adjacent the lens to bring any selected aperture into alinement with the lens.

6. A schematic eye comprising a lens, a diagrammatic retina, means supporting the retina and lens for manual adjustment toward and from each other to represent various conditions of myopia, emmetropia and hypermetropia, said supporting means permitting direct observation of the retina from a point in front of and independently of the lens, and means carried by the supporting means adjacent the lens for selectively restricting the lines of vision of the schematic eye to correspond with pupils of various shapes and sizes.

7. A schematic eye comprising a lens, a diagrammatic retina, means supporting the retina and lens for manual adjustment toward and from each other to represent various conditions of myopia, emmetropia and hypermetropia, said supporting means permitting direct observation of the retina from a point in front of and independently of the lens opening, a diaphragm containing apertures of different shapes and sizes adjustably carried by the supporting means to bring any selected aperture into alinement with the lens.

8. In a schematic eye, a casing having an opening to represent the pupil opening of the eye and opposite the opening a representation of a retina, a lens carried by the casing in alinement with the pupil opening, and means for varying the effective pupil opening in shape and size, said casing having a cut away portion at one side of the pupil opening for permitting direct observation of the face of the retina.

9. In a schematic eye, a casing comprising telescopic parts adjustable toward and from each other to represent different refractive conditions of the eye, the intermediate portion of the casing being partially cut away to permit observation of the interior, a lens carried by one of said parts and a diagrammatic retina by the other of said parts.

10. In a schematic eye, a casing, a lens and a diagrammatic retina carried by the casing in spaced relation, said casing having an observation opening therein in addition to the lens opening enabling a direct view of the retina from a point in front of the casing and at one side of the lens, and a device having apertures of selected shapes and sizes adjustably mounted within the casing and manually operable from the exterior of the casing to bring any of the apertures into alinement with and behind the lens.

11. In a schematic eye, a casing, a lens and a diagrammatic retina carried by the casing in spaced relation, the retina having a scale upon one portion thereof, said casing having an aperture of irregular outline behind the portion of the retina carrying the scale for admitting light to illuminate said portion of the retina.

12. A schematic eye comprising a lens, a diagrammatic retina, means for supporting the same in spaced relation and permitting direct observation of the retina from a point in front of and independently of the lens, said retina having a scale upon a portion thereof, said supporting means permitting illumination of the scale carrying portion of the retina from the rear.

13. A schematic eye comprising a lens, a diagrammatic retina having a scale upon a portion thereof, means supporting the retina and lens for manual adjustment toward and from each other to represent various conditions of myopia, emmetropia and hypermetropia, said supporting means permitting illumination of the portion of the retina having the scale thereon.

14. A schematic eye comprising telescopic parts one of which carries a lens and another a diagrammatic retina having a scale upon a portion thereof, said telescopic part carrying the retina having an aperture therein behind the scale carrying portion of the retina for illuminating the scale.

In witness whereof, I hereunto subscribe my signature.

MANUEL URIBE-TRONCOSO.